(12) United States Patent
Myers et al.

(10) Patent No.: US 7,132,606 B2
(45) Date of Patent: Nov. 7, 2006

(54) STATOR COIL ASSEMBLY

(75) Inventors: Timothy M S Myers, Newcastle upon Tyne (GB); Geoffrey A Wilkin, Cramlington (GB); Stephen M Husband, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/031,947

(22) Filed: Dec. 13, 2004

(65) Prior Publication Data

US 2005/0134135 A1    Jun. 23, 2005

(30) Foreign Application Priority Data

Dec. 17, 2003  (GB) ................. 0329290.1

(51) Int. Cl.
*H01B 7/00*    (2006.01)

(52) U.S. Cl. .................. 174/137 R; 174/138 E; 174/138 R

(58) Field of Classification Search ............ 174/137 R, 174/138 R, 138 E
See application file for complete search history.

(56) References Cited

U.S. PATENT DOCUMENTS

| | | | | |
|---|---|---|---|---|
| 6,046,518 A | * | 4/2000 | Williams | ............ 310/43 |
| 6,365,999 B1 | * | 4/2002 | Muhlberger et al. | ........ 310/254 |

* cited by examiner

*Primary Examiner*—Jinhee Lee
(74) *Attorney, Agent, or Firm*—W. Warren Taltavull; Manelli Denison & Selter PLLC

(57) ABSTRACT

A stator coil assembly comprising a stator coil and a mounting platform for the stator coil. The coil has an earth wrap and is bonded to the mounting platform by a resiliently deformable bonding layer. The bonding layer is an electrical insulator formed from silicone rubber and has a thermal conductivity of at least 0.1 W/mK and an electrical resistivity which is at least equal to that of the earth wrap.

14 Claims, 1 Drawing Sheet

STATOR COIL ASSEMBLY

FIELD OF THE INVENTION

The present invention relates to a stator coil assembly, and in particular, but not exclusively, the stator coil assembly of a transverse flux motor.

BACKGROUND OF THE INVENTION

The stator coil of a conventional electrical motor typically comprises long straight sections joined by curved end windings. The coil is usually mounted to the motor by mechanically pressing the straight sections into slots. The coil is then held in place by an interference fit or by slot closure devices. The coil may be vacuum pressure impregnated.

In use, differential thermal expansion occurs between the coil and the coil mount, but the end windings of the coil confer some flexibility that allows a degree of movement between straight sections of the coil and the slots. This movement is usually sufficient to accommodate the differential thermal expansion.

Conventional coils also have semi-conductive wraps to achieve the necessary earthing. The slots are typically the means by which electrically conductive earthing paths for the wrap are provided.

However, in several applications there is a demand for accurately manufactured stator coils which have high mechanical and electrical integrity. This demand exists, for example, in transverse flux motors (TFMs), which are permanent magnet machines under development for ship propulsion.

In contrast to the geometrically complex electrical stator coil of conventional motors, a TFM has a simple solenoidal (i.e. substantially circular) coil. Although this shape is geometrically simple, its manufacture and operation at high voltages require advanced manufacturing and installation techniques.

For example, the operation of TFM stator coils at high voltages and high switching rates, such as those encountered when using inverter based drives, places significant demands on the motor. In particular, it has been found difficult to adapt the conventional method of mounting the coil to the motor such that the differential thermal expansions experienced in use are accommodated while simultaneously the requirements for controlled electrical grounding of the coil's semi-conductor wrap and conductive heat removal are met.

The problem is exacerbated by the limited space available for the coil and coil mounting in the overall TFM.

SUMMARY OF THE INVENTION

Accordingly, the present invention provides in a first aspect a stator coil assembly comprising a stator coil and a mounting platform for the stator coil, the coil having an earth wrap and is characterised in that it is bonded to the mounting platform by a resiliently deformable bonding layer, wherein the bonding layer has a thermal conductivity of at least 0.1 W/mK and an electrical resistivity which is greater or equal to that of the earth wrap.

Preferably, the bonding layer has a thermal conductivity of at least 0.1 W/mK, and more preferably at least 0.627 W/mK. A higher thermal conductivity is preferred in order to reduce temperature differences between the stator coil and the mounting platform, both to reduce differential thermal effects and to effect a substantial proportion of heat removal from the coil.

Preferably, the bonding layer has an electrical resistivity which is substantially the same as that of the earth wrap. Typically, the earth wrap has a surface resistivity in the range about 0.5 to 2 kΩ/square, and preferably is about 1 kΩ/square. With this arrangement the bonding layer can provide the earthing path for the earth wrap.

Obtaining flexible bonding layers with a well defined reliable and repeatable low electrical conductivity can be difficult, and alternatively, the thermally conductive bonding layer may be an electrical insulator, i.e. be substantially completely non-electrically conducting. In this case, preferably, the assembly further has electrical earthing means for electrically earthing the earth wrap of the stator coil.

The elastic modulus of the bonding layer should be sufficiently low to accommodate without tearing or detaching the differential thermal expansion experienced in use between the stator coil and the mounting platform. Preferably, the bonding layer has a Shore A hardness of at most 85, and more preferably in the range of 65 to 85. In general, the lower the Shore A hardness of the bonding layer, the more differential thermal expansion it can accommodate.

The mounting platform may have a substantially flat receiving surface for the coil. Furthermore, the coil surface which faces the mounting platform may be substantially flat. Thus, in certain embodiments, the bonding layer bonds facing, flat, parallel surfaces. This helps to reduce the space occupied by the bonding layer and promotes uniform thermal, electrical and physical properties throughout the layer.

Preferably the bonding layer is formed from rubber, and more preferably from silicone rubber.

A further aspect of the present invention provides an electrical machine comprising the stator coil assembly of the previous aspect. The machine may be a transverse flux motor.

BRIEF DESCRIPTION OF DRAWINGS

The invention will now be described in more detail, with reference to the drawings in which.

DETAILED DESCRIPTION OF THE INVENTION

Figure 1:
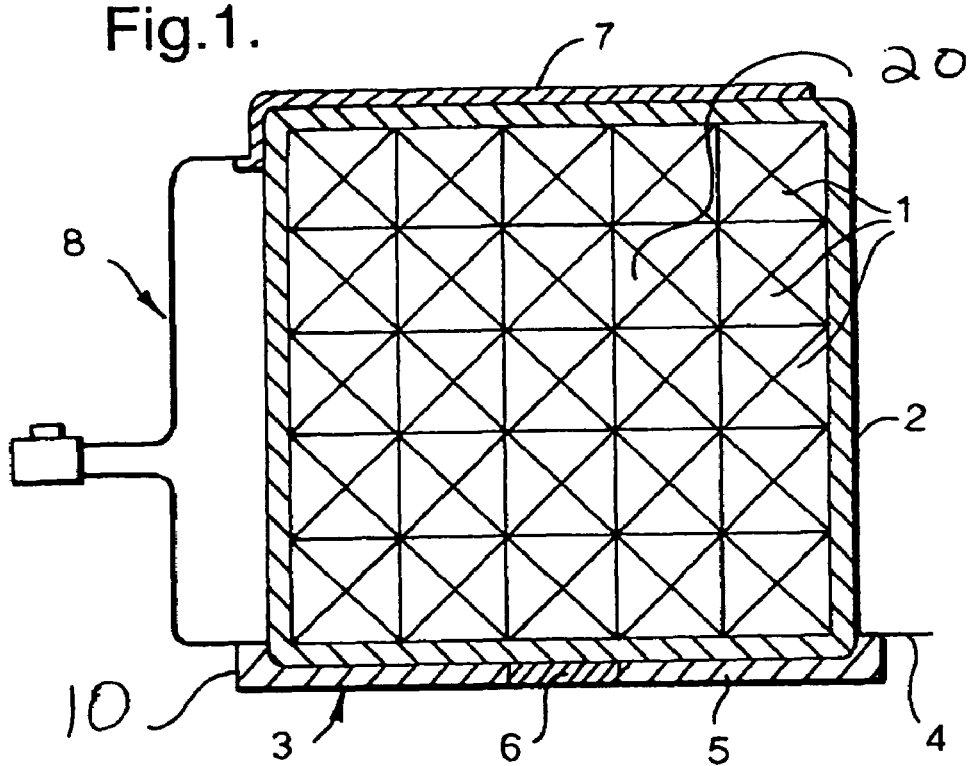
FIG. 1 shows a cross-section through a stator coil and mounting platform of a TFM according to an embodiment of the present invention.

FIG. 1 shows a cross-section through a stator coil 20 and mounting platform 10 of a TMF according to an embodiment of the present invention.

The coil is circular in shape and comprises a series of turns 1 of conductive wire covered by insulation with an outer earth wrap 2. The coil is shown with its bottom face positioned on a flat receiving surface 3, which is the floor of an annular recess formed in a water-cooled platform 4. The inner and outer diameters of the recess are respectively slightly smaller and larger than the inner and outer diameters of the coil.

A bonding layer 5 of thermally conductive silicone rubber bonds the coil to receiving surface and also ensures that the coil does not come into direct contact with the platform so that electrical isolation of the coil and platform is properly controlled.

To form the bonding layer, electrically insulating spacers 6, which control the ultimate thickness of the layer, are placed at intervals on the receiving surface. The silicone rubber, which before curing is a pourable liquid, is poured into the recess to at least the level of the spacers and the coil is then carefully rested on the spacers. The rubber is cured by heating the platform and coil in an oven, or may be cold cured depending on the rubber specification.

In use, the relatively low elastic modulus of the rubber accommodates the differential thermal strains set up between the coil and the platform. However, the relatively high thermal conductivity of the rubber encourages heat flow from the coil to the platform, which helps to reduce these strains and also keeps the coil at a safe operating temperature.

Figure 2:
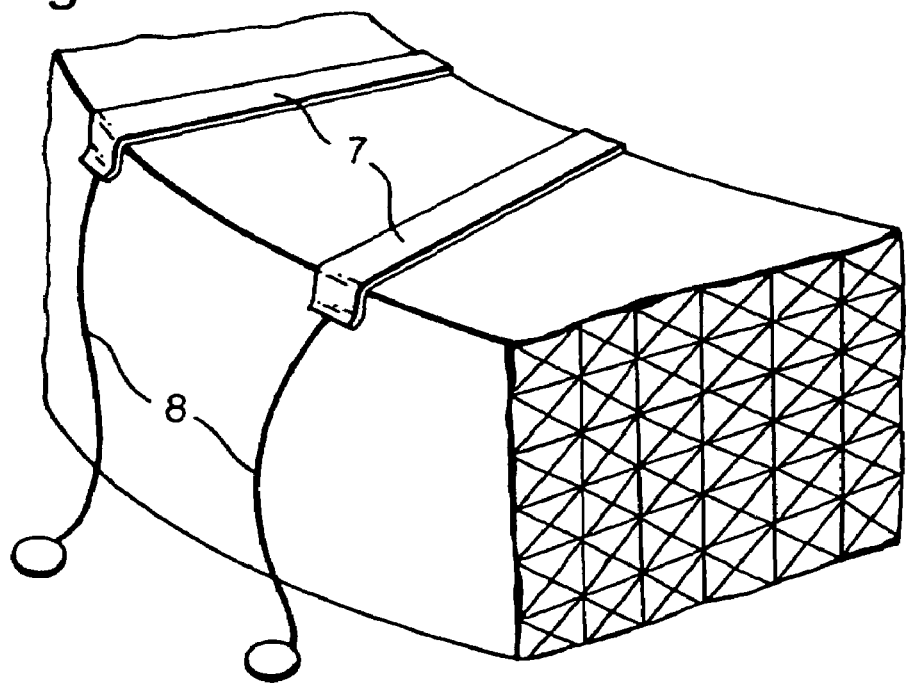
FIG. 2 shows portions of the top and outer faces of the coil of FIG. 1.

In some embodiments the silicone rubber may have an electrical resistivity which is equal to that of the earth wrap, in which case the rubber can form the earthing path for the earth wrap of the coil. However, in the embodiment of FIG. 1 the silicone rubber is an electrical insulator, whereby separate earthing means for the earth wrap is supplied in the form of conductive strips 7 adhered at regular intervals around the top face of the coil by conductive epoxy resin. These strips are then connected to the (electrically conductive) mounting platform by flexible conductive tags 8. The strips and tags are also illustrated in FIG. 2 which shows portions of the top and outer faces of the coil. The spacing of the strips ensures that high voltages do not build up on the coil surface, while the overall surface resistance of the coil is substantially unaffected by the relatively small area of contact of the strips.

In other embodiments the conductive strips can be replaced by conductive wire or wires, which may be bonded to the coil during manufacture of the coil. Alternatively, conductive paint may be used instead of the strips.

A suitable silicone rubber for use in the present invention is product type R-2949 from Nusil Technology of 1050 Cindy Lane, Carpinteria, Calif. 93013, USA. After curing for 30 minutes at 150° C., this has a Type A Shore hardness of 75, a tensile strength of 2.8 MPa, an elongation of 75%, a tear strength of 7.0 kN/m, and a thermal conductivity of 0.627 W/mK. It is a two-part silicone rubber which should be vacuum deaerated after mixing, has a working time at 25° C. of approximately 2 hours, and has a service temperature of from −115° C. to 260° C.

Other suitable silicone rubbers are product type EE RTV1075 from Ambersil and product type Q1-9226 from Dow Corning. Further suitable rubbers would be known to the skilled person, some of which may allow cold curing instead of hot curing.

We claim:

1. A stator coil assembly comprising a stator coil and a mounting platform for the stator coil, the coil comprising a series of turns of conductive wire covered by insulation and having an outer semi-conducting earth wrap and being bonded to the mounting platform by a resiliently deformable bonding layer, wherein the bonding layer has a thermal conductivity of at least 0.1 W/mK and an electrical resistivity which is greater or equal to that of the earth wrap and a Shore A harness of at most 85, wherein the thickness of the bonding layer is controlled by electrically insulating spacers placed at intervals on the receiving surface, and wherein the assembly further comprises separate earthing means connecting the top face of the coil to the mounting platform by flexible conductive tabs.

2. An assembly according to claim 1 in which the bonding layer has a conductivity of 0.627 W/mK.

3. An assembly according to claim 1, wherein the bonding layer has an electrical resistivity which is substantially the same as that of the earth wrap.

4. An assembly according to claim 1, wherein the bonding layer is an electrical insulator.

5. An assembly according to claim 1, wherein the bonding layer is formed from rubber.

6. An assembly according to claim 5, wherein the rubber is a silicone rubber.

7. A transverse flux motor including an assembly according to claim 1.

8. An assembly according to claim 1, wherein the coil is a substantially circular solenoid coil.

9. An assembly according to claim 1, wherein the mounting platform is water-cooled.

10. An assembly according to claim 1, wherein the mounting platform comprises an annular recess the floor of which acts as a receiving surface for the coil.

11. An assembly according to claim 9, wherein the inner diameter of the annular recess is smaller than the inner diameter of the coil and the outer diameter of the annular recess is larger than the outer diameter of the coil.

12. An assembly according to claim 1, wherein the separate earthing means is in the form of a conductive strip.

13. An assembly according to claim 1, wherein the separate earthing means is in the form of conductive wires.

14. An assembly according to claim 1, wherein the separate earthing means is in the form of conductive paint.

* * * * *